United States Patent [19]

Westervelt et al.

[11] 3,913,060

[45] Oct. 14, 1975

[54] THERMOOPTIC SONAR SYSTEM

[75] Inventors: Peter J. Westervelt, Providence, R.I.; Richard S. Larson, East Hartford, Conn.; Thomas G. Muir, Austin, Tex.

[73] Assignee: The United States of America as represented by the Secretary of the Navy, Washington, D.C.

[22] Filed: Mar. 4, 1974

[21] Appl. No.: 447,599

[52] U.S. Cl. .............................. 340/3 R; 340/12 R
[51] Int. Cl.² ............................................ G01S 9/66
[58] Field of Search ....... 340/3 A, 3 R, 12 R, 12 SD

[56] References Cited
UNITED STATES PATENTS

| | | | |
|---|---|---|---|
| 3,230,506 | 1/1966 | Hellund | 340/12 SD |
| 3,322,231 | 5/1967 | Gournay | 181/.5 |
| 3,351,901 | 11/1967 | Padberg, Jr. | 340/12 R |

*Primary Examiner*—Richard A. Farley
*Attorney, Agent, or Firm*—R. S. Sciascia; R. E. O'Neill

[57] ABSTRACT

A means of generating usable sonar beams in water comprising, a high powered laser, a standpipe for conducting a beam from the laser to a predetermined depth in the water, a beam splitter for directing the laser beam along two paths in the water, the laser beam being absorbed in the water and the energy contained therein converted to acoustical energy by the expansion of the water along the paths thereby generating a coherent acoustic beam perpendicular to the two paths.

5 Claims, 9 Drawing Figures

$$\Box^2 p = \frac{-\beta}{C_p} \frac{\partial H}{\partial t}$$ —30

$$H = a I_0 e^{-(aZ + i\omega t)}$$

$$p(r,\theta) = \frac{-ia\omega\beta I_0 e^{-i\omega t}}{4\pi C_p} \int_V \left\{ e^{-aZ} \Theta(Z) + e^{aZ} \Theta(-Z) \right\} \frac{e^{ik|\vec{r}-\vec{r}'|}}{|\vec{r}-\vec{r}'|} dV$$

$$p(r,\theta) = \frac{-ia^2\omega\beta P_0}{2\pi r C_p} \left\{ \frac{e^{-i(\omega t - kr)}}{d^2 + k^2 \cos^2\theta} \right\}$$

$$SPL = 20 \log \frac{f\beta P_0}{r C_p}$$

$$D(\theta) = \frac{a^2}{a^2 + k \cos^2\theta}$$

$$L_s = 20 \log \frac{f\beta P_0}{91 C_p}$$

$$\Theta_{HP} = 2\sqrt{\sqrt{2}-1} \left\{ \frac{a}{k} \right\}$$

FIG. 5

THERMOOPTIC SONAR SYSTEM

The invention described herein may be manufactured and used by or for the Government of the United States of America for governmental purposes without the payment of any royalties thereon or therefor.

Sonar, as a science, is not old in the sense of science as science is measured, but has been with us for many years. The researchers in the field have expanded the frontiers and have refined many concepts so that improvements are difficult to come by, hard to accomplish, and degrees of improvement relatively small yet necessary. Highly sophisticated equipment costing hundreds of thousands of dollars have been developed on both large scale and small including such things as sonars for submarine torpedo guidance systems, devices for soundings, devices for locating swimmers and mines, devices for location of objects on the bottom of the ocean and many other devices.

Basic concepts as set forth in this invention and covered in the claims deal with the new concept of generating a coherent acoustical beam under water by propagating a pair of coherent light beams in two directions and thus constructing an acoustical signal at right angles to those beams thereby utilizing water as an antenna of large dimensions.

The description as set forth herein and the basic objects of this invention are as follows.

It is an object of this invention to provide a new and novel form of sound generator for use in sonar systems.

It is another object of this invention to provide a new and novel thermooptic sonar system comprising, means for generating a laser beam, means for projecting the beam through a non-absorbing media to a specific point in water, projecting the beam along first and second axis thereby generating a coherent acoustical wave perpendicular to the two axes; a hydrophone receiving system for receiving return echoes from targets impinged upon by the generated acoustical signal, and circuitry for processing signals from the hydrophones and the laser circuit to display target information.

And yet a further object of this invention is to provide an improved thermooptic sonar system capable of locating remotely positioned targets comprising; a laser and circuitry coupled thereto for generating a first high powered laser beam; a means for modulating the first beam at an acoustical rate; a medium for conducting the beam to a predetermined location thru a non-absorbing medium; means for dividing the laser beam into second and third substantially equal beams of light; means for projecting the second and third laser beams along second and third axis, through the water, the second and third light beams being absorbed by the water over a finite beam path, the absorption of the light beam heating the water thereby causing the expansion and the production of an acoustical signal that is a coherent signal perpendicular to the axis of the second and third light beam; means for receiving return signals echoed from remotely located targets; and means coupled to receiving means and beam generating means to develop signals for displaying the return echo on the display device.

Still a further object of this invention is to provide a thermoacoustic array device including a laser for developing a beam in the blue-green region of the light spectrum which is the portion of the light spectra that travels the greatest distance in water.

And still a further object of this invention is to provide a modulated thermoacoustic array for developing a sound signal in water through the absorption of light energy causing heating and cooling of the water encountered by the beam.

Other objects, advantages and novel features of the invention will become apparent from the following detailed description of the invention when considered in conjunction with the accompanying drawings wherein:

FIG. 5 shows the outline of Westervelt-Larson derivation for one form of the laser excited thermoacoustic array.

Figure 1:
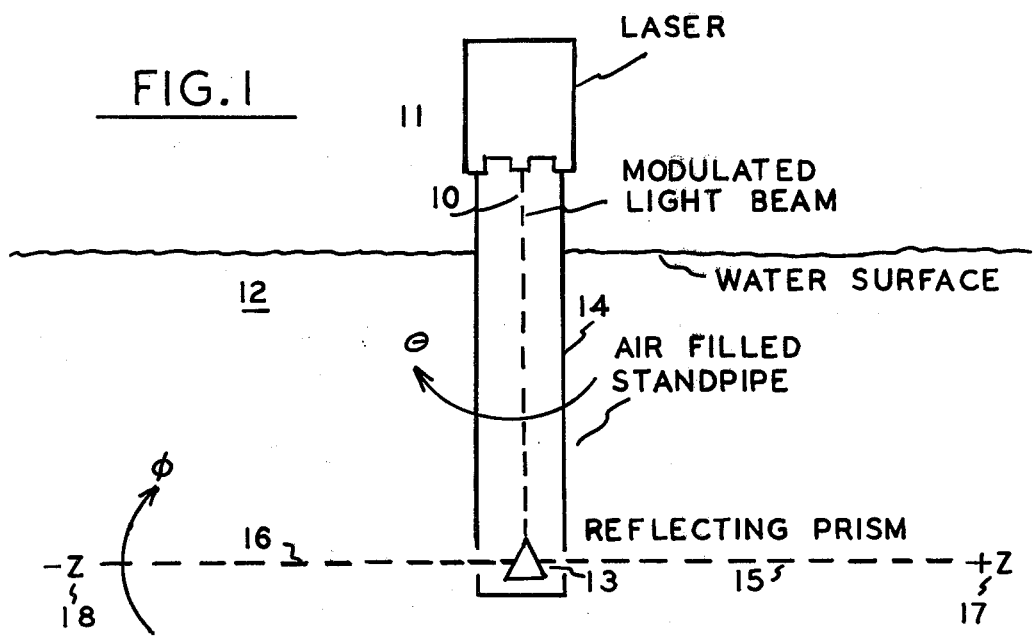
FIG. 1 shows the invention schematically.
Figure 2:
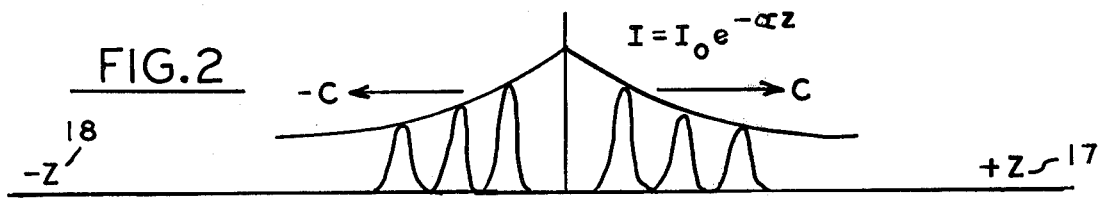
FIG. 2 shows the transmission and absorption of a modulated light pulse.
Figure 3:
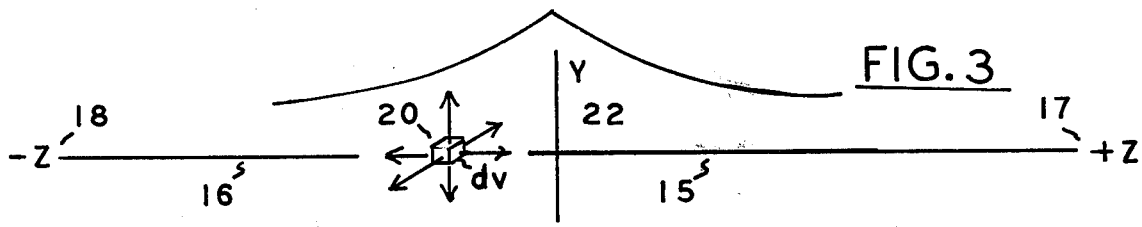
FIG. 3 shows the acoustic excitation through oscillatory thermal expansion.

It is instructive to examine the process by which heat can be made to create sound. Although this process is more efficient in gases, applications to water media are of greater immediate interest. FIGS. 1, 2 and 3, illustrate the basic geometry. Light 10 from a modulated, pulsed laser 11, enters the water 12 by use of a reflecting prism 13 mounted in a standpipe 14 as shown in FIG. 1. A possible three cycle transmission in the presence of optical absorption is shown in FIG. 2. The modulated light pulses 15, 16 enter the water on the +z 17 and −z 18 axis, and travel along this axis at the speed of light. The effect of optical absorption is to exponentially reduce the intensity of transmitted light with increasing distance along the z axis. It is this absorption and the attendant conversion of light to heat that provides a basis for the laser-excited, thermoacoustic array.

Consider, for example, an elemental volume of water 20 on the z axis, as shown in FIG. 3. This elemental volume is traversed by the modulated light pulse 16, and experiences a local rise and fall in temperature in sympathy with the oscillatory intensity of the modulated light. This causes a local oscillatory change in the size of the elemental volume in accordance with the laws of thermodynamics as modified by the principle of adiabaticity. The oscillation of the elemental volume causes the radiation of sound in all directions. Although each elemental volume is excited in sequence, the rapidity of the speed of light in comparison to the speed of sound effectively allows one to assume total instantaneous excitation of all elemental volumes, at least for the purpose of calculating the acoustic field.

When the contributions of each elemental volume are summed, only those radiations in the plane of the y axis 22 will have the proper phase to cause constructive interference. This means that the acoustic field of the thermoacoustic array will develop a sharp maximum with a monotonic decay in the angle parameter $\theta$, and will be omnidirectional in the angle parameter $\theta$. The monotonic decay with $\theta$ means that the array is shaded exponentially by the optical absorption so that its beam pattern will contain no minor lobes. This feature is highly desirable as regards possible Naval applications.

A derivation of this form of the Westervelt-Larson thermoacoustic array is outlined in FIG. 5. It begins with an inhomogeneous wave equation 30, in which $p$ is the acoustic pressure, $\beta$ is the coefficient of thermal expansion ($C_p$ is the specific heat at constant pressure and H is the energy absorbed per unit volume, per unit time.) If the heat is generated by the energy lost from a laser beam modulated at angular frequency $\omega$, then H can be expressed as shown in the second equation of FIG. 5. Here, $I_0$ is the intensity of laser light and $\alpha$ is the optical absorption of the medium. After the second equation is substituted in the inhomogenous wave equation, a solution in the form of the integral equation as shown in the center of FIG. 5 is obtained. Here, $0(\pm z)$ is a factor accounting for the phase of volumetric sources in the $+z$ and $-z$ regions, and $k$ is the acoustic wave number. At long ranges from the source, the solution to the integral equation can be easily obtained as given in the box just beneath the integral. Solutions for the peak sound pressure level SPL, the peak source level, $L_s$ the directivity function, $D(\theta)$, and the half power beamwidth, $\theta_{HP}$ are given in the lower boxes of the figure. In all of these solutions, $P_o$ is the power input to each direction and $f$ is the modulation frequency.

Note that the source level is independent of the optical absorption, while the directivity depends strongly on this parameter. While it is true that the lower the absorption, the longer the array and the narrower the beamwidth, it is also true that lowering the absorption decreases the conversion of light to heat in such a way as to conceal the attendant increase in source level expected from the increase in directivity. The source level depends solely on a group of constants and on the product of the optical power and the modulation frequency. Doubling of either of these parameters causes a 6 dB increase in the source level. The directivity (i.e., the half-power beamwidth) depends solely on the optical absorption and on the acoustic wave number, such that either halving the absorption or doubling the modulation frequency reduces the beamwidth by a factor of 2.

Although the theory of thermoacoustic arrays is in its infancy and much work remains to be done, it is nonetheless worthwhile to examine the Westervelt-Larson results with numbers, so as to assess the potential of this technique. Of primary interest is the source level capability, which is shown plotted in FIG. 6 as a function of power input to each leg for several modulation frequencies. Investigation of the figure shows that laser power in the megawatt range would produce source levels on the order of 100 dB re 1 bar at 1 yd at a modulation frequency of 100 kHz, while 80 dB would be obtained at 10 kHz and 60 dB at 1 kHz. Higher source levels could be obtained with higher powered lasers.

Figure 6:
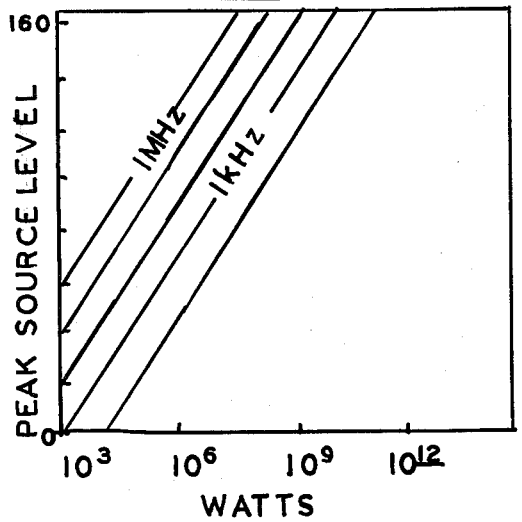
FIG. 6 shows the source level capability in water.

The question now arises as to what is reasonable as regards the feasibility of high-powered, modulated lasers. Although the laser technology is continually expanding at an accelerated pace, some generalizations on this question can nonetheless be made, with the full realization that they may be superceded as time progresses. Presently popular among the cw lasers are the gas-dynamic devices whose continuous output are in excess of 1 kW. These lasers can also be pulsed at powers in excess of 3 kW. Most pulsed lasers, however, use solids such as glass, ruby or neodymium YAG rods for optical excitation. By employing modulated Pockel's cells in the optical cavity to control the resonance of these devices, one can obtain peak powers ranging from megawatts to gigawatts, and in some cases terawatts. This type of laser, however, produces only extremely short pulses (with durations on the order of nanoseconds) so that it is not really suited to the thermoacoustic array problem. It is possible, however, to place the Pockel's cell modulator exterior to the optical cavity so as to modulate the relatively low power, conventional mode output of such a laser, while amplifying the modulated bursts with successive laser amplifiers. These bursts would contain a sufficient number of modulated light cycles to generate tone bursts through the thermoacoustic process. For operation in this mode, peak power outputs on the order of a megawatt are possible for pulses containing approximately five cycles at modulation frequencies of few kHz. For purposes of discussion, therefore, the source level capabilities just discussed in connection with FIG. 6 are considered to be good estimates of what can be achieved with existing laser technology.

Figure 7:
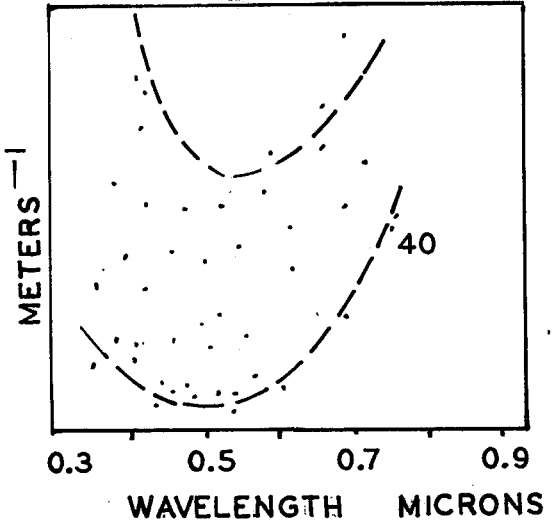
FIG. 7 shows the optical attenuation in sea water.
Figure 8:
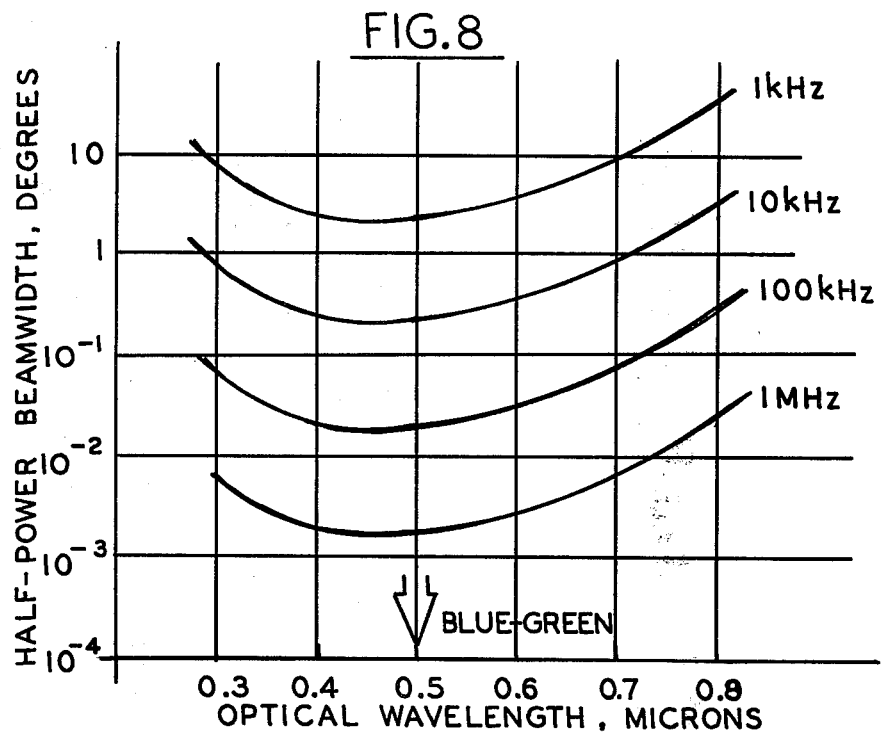
FIG. 8 shows the beamwidth capability.

For calculation purposes, the most important feature of the thermoacoustic array is the attainable beamwidth. As was discussed earlier, the beamwidth depends strongly on the optical absorption of the medium, and this parameter varies with the type of water. A collection of attenuation data for seawater is shown in FIG. 7. Although there is considerable spread in these data, most of the open ocean data falls toward the lower boundary 40. An average of the open ocean data was therefore used in the computations to follow. Results for the attainable beamwidth as a function of the optical wavelength are shown in FIG. 8 for several acoustic frequencies. The curves are seen to minimize the blue-green light region, due to the minimum in the absorption spectrum near $\lambda = 0.5\mu$. In this region, beamwidths in the millidegree range would be obtained at acoustic frequencies in the neighborhood of 1 MHz. Beamwidths in the hundredths of a degree range would be obtained for frequencies near 100 kHz and beamwidths on the order of a few degrees would be realized at frequencies near 1 kHz.

Figure 9:
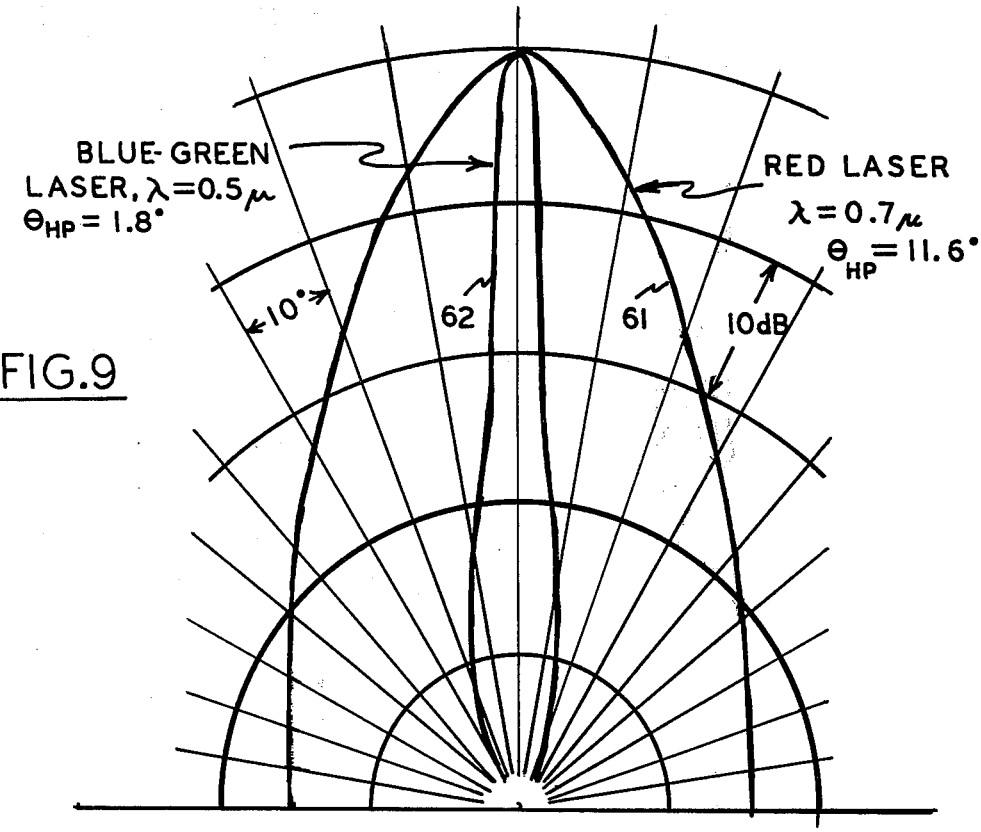
FIG. 9 shows beam patterns for two different wave length lasers.

The beam pattern shape for the thermoacoustic array is shown in FIG. 9. Two 1 kHz beam patterns for two optical wavelengths are illustrated. Both patterns 61, 62 have the shape of a "bowling pin," being narrow at the top and somewhat wider at the base. Both patterns are devoid of minor lobes, due to the exponential shading of the thermoacoustic array, brought about by optical absorption. The narrow pattern, calculated for a 0.5 $\mu$ laser illustrates the desirability of working in the blue-green region.

The theory and calculations presented support the contention that the laser-excited thermoacoustic array is a sound source with the potential to provide order of magnitude improvements in the resolution and performance of Naval sonars. With a peak laser power of one megawatt (produced in a short burst of modulated light) as a convenient limit of existing laser technology, attainable are acoustic source levels of 100 dB at frequencies near 100 kHz. The radiation pattern of the acoustic pulses so created would be approximately two hundredths of a degree wide and having no undesirable minor lobes, and would display a sharp decay with increasing angle from the acoustic axis. Radiation in planes containing the optical axis are omnidirectional, so that the application of this technique to sonar require a receiving transducer with some vertical directivity. One such configuration would employ a conventional cylindrical hydrophone mounted in a dome. The optical standpipe of FIG. 1 passes through its center, protruding through a hole in the floor of the dome so as to couple the transmitted light to the water. The modulated light is converted to sound, and echoes from targets would be received by the conventional electroacoustic hydrophone.

Although the aforementioned 100 kHz radiation is much too high in frequency for ASW applications, it would be adequate for either mine countermeasurers or swimmer defense sonar. For these applications, a modicum of focusing, brought about by transmitting the light beams in directions somewhat less than 180° to each other is necessary to circumvent the aperture limit on attainable resolution.

Figure 4:
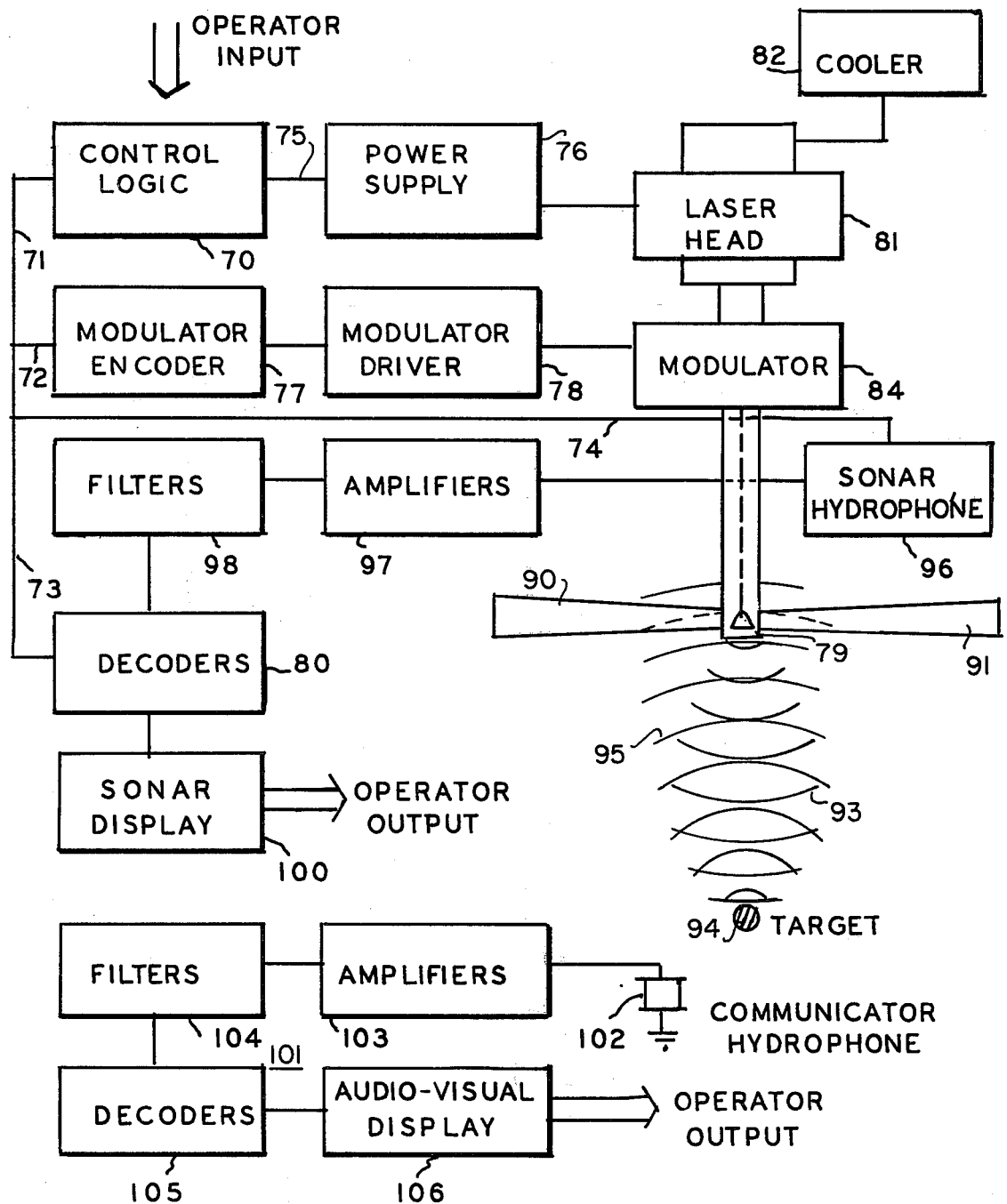
FIG. 4 shows the thermooptic sonar/communicator system.

In the invention at hand, a thermoacoustic array like the one described above is utilized in either a sonar or a communicator so as to transmit highly directive acoustic signals. One such system is diagrammed in FIG. 4. The "brain" of the device shown is the electronic circuitry 70 contained in (1) and labeled "control logic." This circuitry, with instructions from the human operator, provides all control signals via 71, 72, 73, 74, and 75 to the system, including signals for power supply 76 charging and triggering, modulation coded beam scanning 77, 78 orientation of the optical beam deflector 79 and for replica signal storage in decoders 80 incidental to signal processing and decoding of received signals. The power supply 76 provides energy and "fire" control signals to the head 81 which is maintained at desirable temperature by cooler 82. High intensity light pulses 10 emitted by laser head 81 are envelope modulated into coded sinusoidal pulses by light modulator 84 which is in turn controlled by modulation driver amplifier 78 and modulation encoder 77. The modulation encoder is designed to provide rapid fire, frequency-coded modulation signals so as to enable the transmission of different frequency coded signals in each adjacent optical (and hence acoustical) beam for high search rate applications. Light deflectors 79 control the direction of transmission of optical (and hence acoustical) beams and thereby provide for formation of a number ($n$) of narrow transmitted beams over a wide sector. Once transmitted the modulated optical beams are absorbed in thermal volume 90, 91 where heat is generated in sympathy with the coded modulation of each light pulse. The heat creates thermal expansions and contractions at the coded modulation frequencies which in turn cause narrow sound beams 93 to be transmitted in plane(s) perpendicular to that of the optical excitation. When the system is configured as an echo-ranging sonar, these highly directive sound beams 93 will propagate through the medium and will reflect off target 94. Echoes bearing information about the size, shape and location of targets 94 return to the sonar in reflected beams 95 and are detected by conventional sonar array hydrophone 96, housed in a sonar dome (Not shown).

Electric signals are produced by hydrophone 96 in proportion to the reflected acoustic signals, and the electric signals are each processed by amplifiers 97, filters 98, and decoders 80 so that they may be separated as to the range and bearing of the targets and/or the reflecting facets and scattering surfaces of a single target.

The processed signals are then applied to suitable sonar display 100 enabling the sonar operator to view the insonified target scene. Should the system be configured as a communicator, the operation of the transmitter of the system just described is essentially the same with the exception that the modulation encoder 77 will be so designed as to encode voice messages, and/or coded messages in a specified beam direction, rather than to code $n$ signal beams over a wide sector. Components 96, 97, 98, 80, 100 are not required for the communicator. A pre-designated message receiver 101 mounted on either a fixed or a mobile platform will employ communicator hydrophones 102 which generate electrical signals proportional to some function of the transmitted message. The electrical signals are processed by amplifier 103 and filter 104 and are "unscrambled" by decoder 105. The resulting messages are commuted to the human operator by audio/visual display 106.

Obviously many modifications and variations of the present invention are possible in the light of the above teachings. It is therefore to be understood that within the scope of the appended claims the invention may be practiced otherwise than as specifically described.

We claim:

1. An improved thermooptic sonar system for location of remote targets comprising:
   a. a laser for generating a laser beam;
   b. a elongated cylindrical housing having a first major axis filled with a non-light absorbing material;
   c. means for directing said laser beam along said first major axis;
   d. a beam splitter positioned on said first major axis, said beam splitter splitting said laser beam and projecting said laser beam along a second and a third axis;
   e. optical windows in said housing positioned along said second and third said axis allowing said split laser beam to be projected along said second and third said axis into water, said beam being absorbed along said second and third said axis, causing heat in small increments in water along said axis thereby causing thermal expansion of said small incremental portions in said water, and generating a sound wave that is projected at right angles to said second and third axis;
   f. an acoustical sound receiver in juxtaposition with said first axis to receive echo signals from said generated acoustical beam; and,
   g. circuitry coupled to said receiver and said laser to process signals from said laser and said receiver to display return echoes from remotely spaced targets.

2. The improved thermooptic sonar system of claim 1 wherein said second and third axis are substantially 180° apart.

3. A thermooptic sonar system comprising:
   a laser head for projecting a laser beam;
   b. a modulator in the path of said beam to provide modulation to said beam;
   c. a standpipe filled with non-light absorbing material for coupling said modulated laser beam to a predetermined point in water;
   d. a beam splitter in said standpipe for splitting said modulated beam along a first and a second axis thereby causing a coherent sound wave to be propagated in said water at right angles to said first and second axis;

e. a sonar hydrophone positioned adjacent to said standpipe for the purpose of receiving sonar echoes from a target; and, f. circuitry coupled to said hydrophones to process return signals from an echo and to display in usable form the information of said return signals.

4. The thermooptic sonar system of claim 3 wherein the laser beam generated is in the optical range.

5. The thermooptic sonar system of claim 4 wherein the laser beam is in the wave length wherein it has the least absorption per unit distance.

* * * * *